United States Patent [19]

Nikjou

[11] Patent Number: 5,638,542
[45] Date of Patent: Jun. 10, 1997

[54] LOW POWER NON-OVERLAP TWO PHASE COMPLEMENTARY CLOCK UNIT USING SYNCHRONOUS DELAY LINE

[75] Inventor: Bobby B. Nikjou, Tempe, Ariz.

[73] Assignee: Intel Corporation, Santa Clara, Calif.

[21] Appl. No.: 643,406

[22] Filed: May 6, 1996

Related U.S. Application Data

[63] Continuation of Ser. No. 175,621, Dec. 29, 1993, abandoned.

[51] Int. Cl.$^6$ ........................................... G06F 1/32
[52] U.S. Cl. ........................................... 395/750
[58] Field of Search ........................... 395/750, 550; 307/269, 480; 327/141, 144, 162, 163, 291, 293, 295, 296; 364/707

[56] References Cited

U.S. PATENT DOCUMENTS

| | | | |
|---|---|---|---|
| 3,961,269 | 6/1976 | Alvarez, Jr. | 328/62 |
| 4,409,671 | 10/1983 | Daniels et al. | 395/550 |
| 4,496,861 | 1/1985 | Bazes | 307/602 |
| 4,645,947 | 2/1987 | Prak | 307/269 |
| 4,691,122 | 9/1987 | Schnizlein et al. | 307/279 |
| 4,816,700 | 3/1989 | Imel | 307/269 |
| 4,877,974 | 10/1989 | Kawai et al. | 307/269 |
| 4,929,854 | 5/1990 | Iino et al. | 307/480 |
| 4,980,585 | 12/1990 | Bazes | 307/529 |
| 5,120,990 | 6/1992 | Koker | 307/269 |
| 5,122,693 | 6/1992 | Honda et al. | 307/480 |
| 5,220,206 | 6/1993 | Tsang et al. | 307/296.3 |
| 5,278,466 | 1/1994 | Honoa et al. | 307/480 |
| 5,294,842 | 3/1994 | Iknaian et al. | 307/269 |
| 5,309,035 | 5/1994 | Watson, Jr. et al. | 307/269 |
| 5,357,204 | 10/1994 | Knoll | 328/62 |
| 5,376,842 | 12/1994 | Honoa et al. | 326/21 |
| 5,388,249 | 2/1995 | Hotta et al. | 395/550 |
| 5,444,405 | 8/1995 | Truong et al. | 327/239 |
| 5,481,573 | 1/1996 | Jacobowitz et al. | 375/356 |

*Primary Examiner*—Ayaz R. Sheikh
*Attorney, Agent, or Firm*—Blakely, Sokoloff, Taylor & Zafman

[57] ABSTRACT

A clock generator which utilizes a SDL, power management circuitry, phase drivers and non-overlap logic all integrated on a single chip to output a set of non-overlapped, complementary clock phases for each processor and for on board peripherals. The present invention also has application for use with multiple discrete processors used on an application or system validation board where one or more of the processors may run at different clock speeds from the others or be stopped. The integrated non-overlap logic reduces the clock skewing among various component on the application board, thus, increasing the overall performance of the system. The present invention is specifically directed to clock generation circuitry including a circuit which receives clock phases generated by a SDL, or from a set of frequency dividers and produces non-overlapped clock phases for each on-board processor and for the on-board peripherals.

6 Claims, 9 Drawing Sheets

LOW POWER NON-OVERLAP TWO PHASE COMPLEMENTARY CLOCK UNIT USING SYNCHRONOUS DELAY LINE

This is a continuation of application Ser. No. 08/175,621 filed Dec. 29, 1993, now abandoned.

BACKGROUND OF THE INVENTION

A typical board design development for a communication application requires many discrete modules or chips. Among these modules are, a general purpose microprocessor, one or two DSP cores, associated peripherals such as DMA, UART, viterbi accelerator, memory including RAM or ROM and a clock generator unit capable of frequency synthesis.

Most microprocessors and DSP cores are designed based on complementary non-overlapped two phase clocks which may be run at a different operating frequency with respect to one another. Therefore, minimal clock skewing among all modules is desirable to achieve high performance. One solution that helps in minimizing clock skewing and improving performance is high integration single chip solution as shown in FIG. 1. However, many system development or application board designs rely on the use of multiple single chips prior to the high integration single chip solution which is technology driven.

Traditionally, clock generator chips used in conjunction with development of application boards can generate only a single phase clock with multiple output frequencies. Therefore, to provide a complementary non-overlapped two phase clock that is required by most microprocessors, DSP cores and peripherals, additional on board discrete components are required to generate the desired non-overlapped logic. This has a direct impact on the clock skewing which is proportional to system performance i.e., lower clock skews results in a higher performance. In addition, there may be no provision to control the clock to each processor or peripherals for power save options. In the present invention, instead of adding external discrete components to a clock generator circuit for the purpose of obtaining non-overlapped clock phases by delaying one of the clocks a sufficient amount of time to generate the non-overlap between the clock phases, a phase driver and non-overlap logic circuit is integrated on the same chip to provide a set of complementary non-overlap two phase clocks running at different frequencies. In providing support for low power, many power save features are made available within this unit.

The invention utilizes a clock signal which originates from an oscillator which is input into a set of frequency dividers or a frequency multiplier such as a synchronous delay line (SDL) to produce clock signals at frequencies required by the processors and other elements integrated on the same chip. A suitable SDL for this purpose is described in U.S. Pat. No. 4,980,585, specifically, FIGS. 2–9 of the patent which describe a suitable SDL for use with the present invention and supporting elements.

SUMMARY OF THE INVENTION

The present invention is a clock generator which utilizes a SDL, power management circuitry, phase drivers and non-overlap logic all integrated on a single chip to output multiple sets of two non-overlapped, complementary clock phases for each processor and their associated peripherals.

The present invention has application for use in high integration single chip or with multiple discrete processors used on a mother board where one or more of the processors may run at different clock speeds from the others or be stopped. An example of a system where a multiple processor chip of this type may be employed is a general purpose communications processor which may include one or two digital signal processor (DSP) cores and a general purpose microprocessor core as well as associated peripherals such as DMA, timers, UART, arbitration logic as well as on-chip memory.

The present invention is specifically directed to clock generation circuitry including a circuit which receives clock phases generated by a SDL, or from a set of frequency dividers and produces non-overlapped clock phases for each on-board processor and for the on-board peripherals. In this connection, this description will be directed to a specific multiprocessor chip or board having a general purpose microprocessor core, two DSP cores, and associated peripherals. However, the invention is not limited to the specific environment described, and changes needed to use the invention in other environments should be readily apparent to persons skilled in the art.

DETAILED DESCRIPTION OF THE INVENTION

Figure 1:
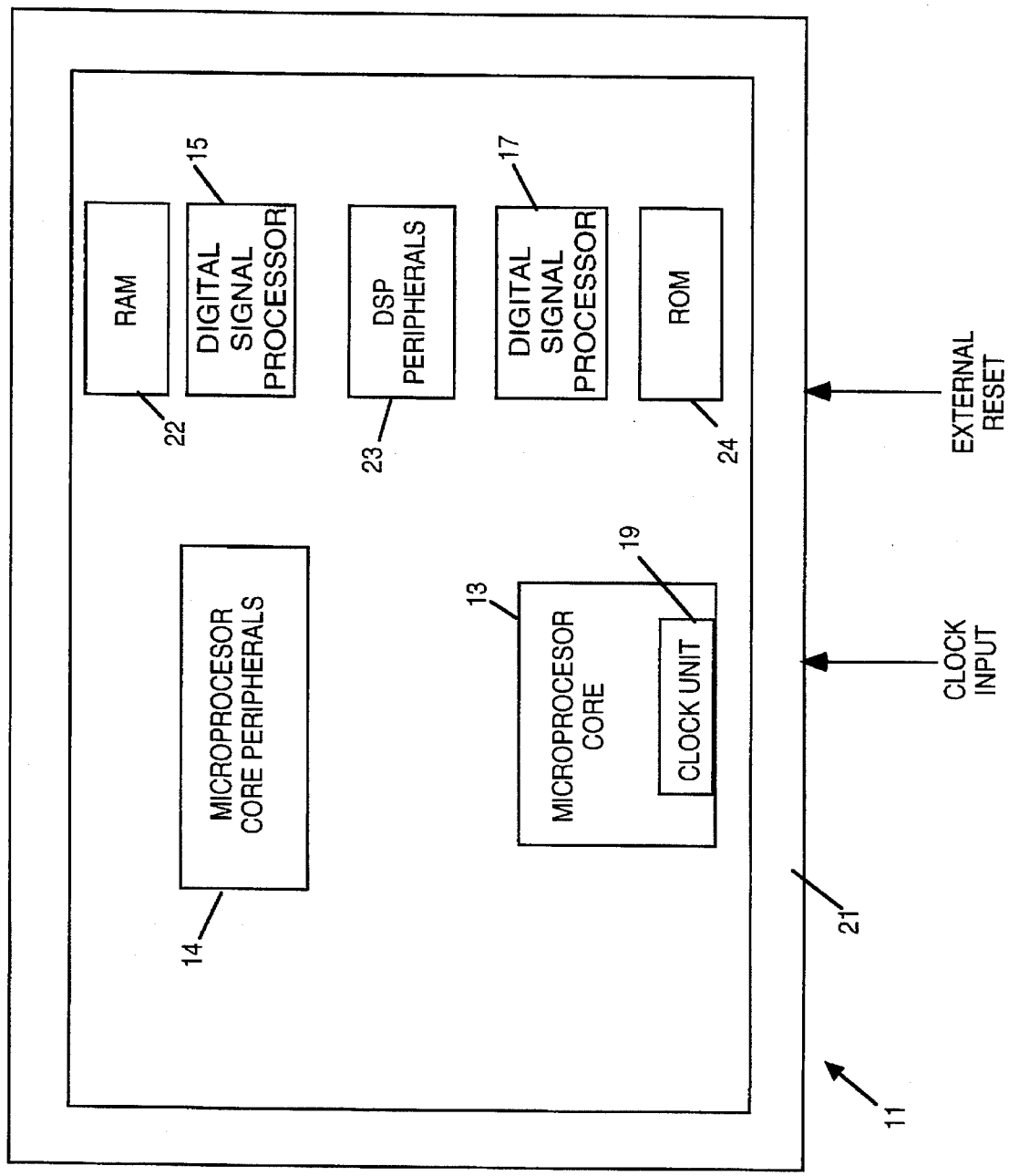
FIG. 1 is a block diagram showing the relationship between the clock unit in which the present invention is utilized and the system which utilizes the generated clocks.

Referring first to FIG. 1, the present invention is used in a multiple processor integrated circuit 11 which includes a microprocessor core 13, a set of core peripherals 14 such as DMA and UART, first and said second digital signal processors 15 and 17, a clock unit 19, a pad ring 21 for inputs to and outputs from the integrated circuit and its components, RAM 22, DSP peripherals 23 such as a viterbi accelerator and ROM 24.

Figure 2:
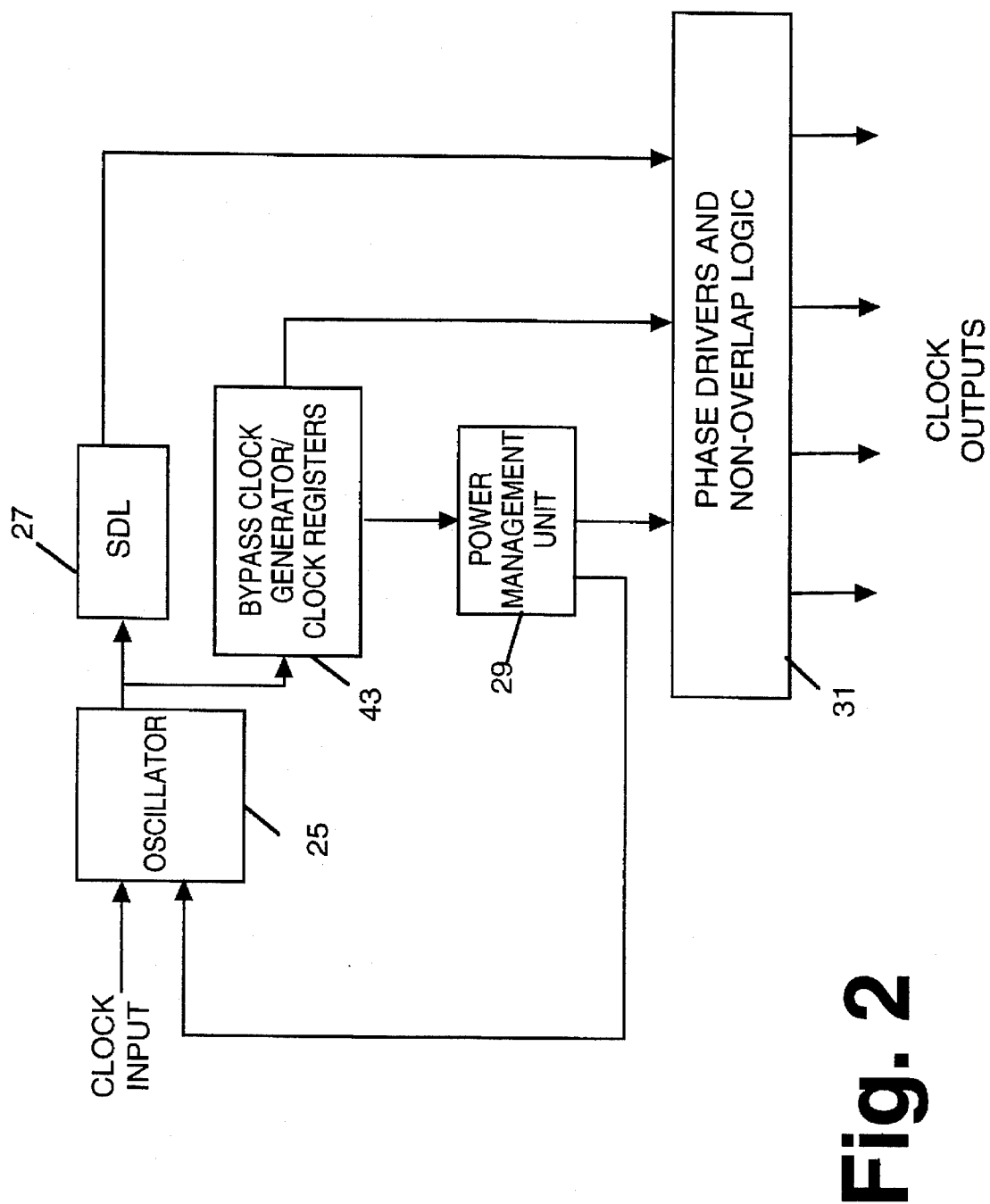
FIG. 2 is an overview block diagram showing the relationship of the phase drivers and non-overlap logic circuit which forms the present invention and the other components of the clock unit.

The present invention mainly lies in a circuit for providing non-overlapped clock phases located in clock unit 19. FIG. 2 shows the elements of the clock unit which comprises oscillator 25 for receiving a clock input, typically from a crystal, and converting it to a clock signal which may be used to generate the various clocks needed by the various components of the chip, a synchronous delay line (SDL) 27 and a bypass clock generator and its associated register set 43, each of which generates from the oscillator clock signal the necessary clocks needed by the microprocessor 13, digital signal processor 15 and digital signal processor 17, arbitration logic within non-overlap logic circuit 31 which selects the output of the SDL or bypass circuit, the power management unit 29 and the invented phase drivers and non-overlap logic circuit 31.

Figure 3:
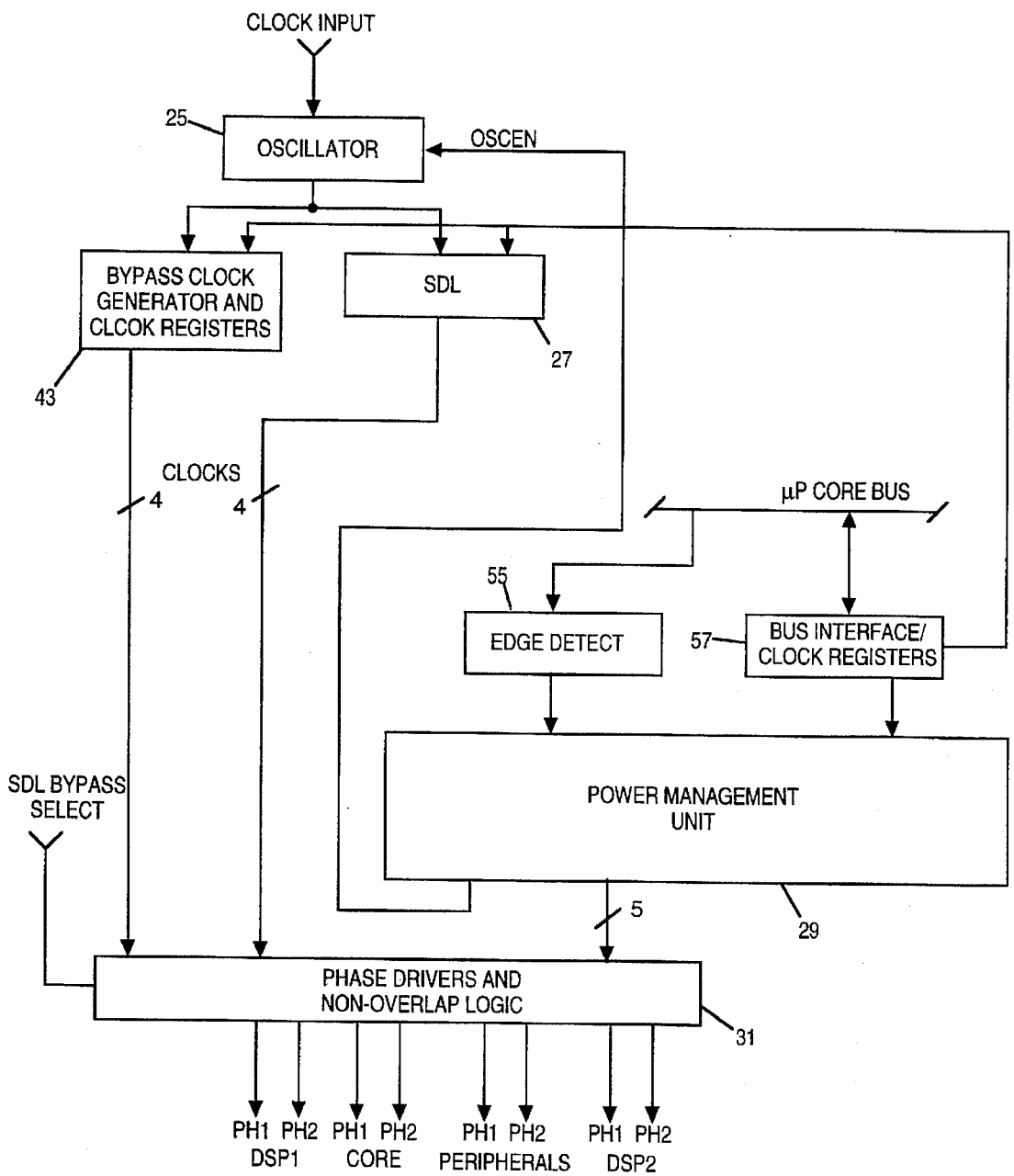
FIG. 3 is detailed block diagram showing the relationship of the phase drivers and non-overlap logic circuit which forms the present invention and the other components of the clock unit.
Figure 4:
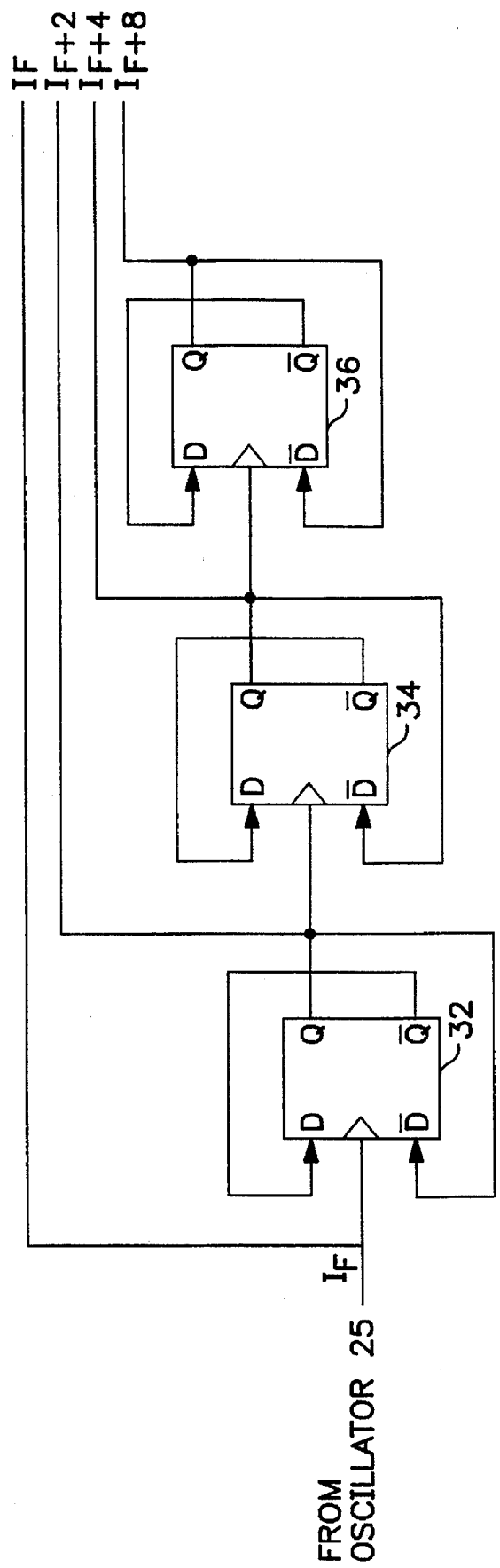
FIG. 4 shows a prior art divider circuit.

FIG. 3 is a more detailed view of the clock unit 19. Bypass clock generator 43 receives the clock signal generated by oscillator 25 along with SDL 27. The bypass clock generator 43 and SDL 27 select and pass their outputs, which are programmed by a clock register (not shown) to select a required frequency multiplication, to SDL/bypass arbitration logic within phase drivers and non-overlap logic circuit 31 which selects the clock signals from either the bypass clock generator 43 or SDL 27. The generation of these clock signals are accomplished using well known prior art techniques. For example, a suitable SDL may be implemented according to the teachings of U.S. Pat. No. 4,980,585. The clocks generated by the bypass clock generator may be obtained by using a frequency divider circuit as shown for example in FIG. 4 which shows a series coupling of flip-flops 32, 34 and 36 which generates frequencies of ½, ¼ and ⅛ of the input frequency from oscillator 25. The selected clock signals are then processed by phase drivers and non overlap logic 31 which actually generates phase 1 and phase 2 clocks for the two digital signal processes (DSP1 and DSP2), for the microprocessor core and its peripherals. FIG. 3 also shows power management unit 29. Also shown for completeness are edge detect 55 and bus interface 57 which provides certain signals used by power management unit 29.

Edge detect 55 processes incoming signals from the general purpose microprocessor core on both phase 1 and phase 2 of the clock signal and generates the signals DHLTQ1 (indicating that the general purpose processor has executed a HALT instruction), EIRQQ2 (internal interrupt requested), NEDMAQ1 (DMA request is pending) and EHLDAQ2 (indicating HOLD/HOLDA protocol is active) which are input to power management flip-flop circuit 53. Bus interface 57 provides read/write control signals as well as address and data signals from the general purpose microprocessor core. These signals are then input to power management register 54. When this register is accessed, the power management signals become available for selective entry to any of the power saving features of the chip. The power management register within the power management unit causes the generation of the signals CPUIDLQ1 (CPU idle mode is set), STRSTDQ1 (standby mode is set) and STRTPDQ1 (power down mode is set) which are input to power management unit 29. The power management register also causes the generation of the signals DSP1STOPQ1 and DSP2STOPQ1 indicating which DSP is to be halted. Other inputs to power management unit 29 are NMIQ1 (non-maskable interrupt), NOSCOK (indicating oscillator external timer has timed out, i.e., steady state has been reached), PHOLDQ2 (indicating processor PHOLD protocol is active) and URST (external reset). The details regarding the circuitry used by edge detect 55 and bus interface 57 to generate the signals used by power management 29 are not needed for an understanding of the present invention, which details would depend on the particulars of the processors and peripherals involved. Details regarding the implementation of power management unit 29 may be found in copending application Ser. No. 08/174,770 filed Dec. 29, 1993. However, from the description provided herein with respect to the outputs generated by these blocks which are input to power management unit 29, a person skilled in the art should be able to implement a suitable edge detect circuit and bus interface circuit, as well as any needed changes to power management unit 29. Table I below and its associated description specify the functionality of the power management register.

TABLE I

| | DSP2STOP | DSP2STOP | STNDBYMD | IDLEMD | PWRDWNMD |
|---|---|---|---|---|---|
| bit content | x x x x x x x x x x x | 1 | 1 | 0 | 0 | 0 |
| bit number | 15 14 13 12 11 10 9 8 7 6 5 | 4 | 3 | 2 | 1 | 0 |

The power management register controls the power management modes of the chip as well as the stop bits for the DSPs.

The chip can only be in one power management mode at a time (powerdown, idle, or standby mode); thus no more than one of the three lower bits is set at any given time. If two or three of these bits are set, no power management mode is entered. To enter powerdown mode, using the described implementation, the lower three bits are set to '001. Similarly, to enter idle and standby modes, the lower three bits are set to '010 and '100 respectively. Power management modes are not actually entered until a halt instruction is executed by the general purpose microprocessor.

To stop a DSP core, a '1 is written to bit 3 (for DSP1) or to bit 4 (for DSP2). To start a DSP, a zero is written to the same bit or bits. A ≦0 will be written to one of these bits by an unmasked DSP interrupt.

During reset, all five bits of the power management register are cleared, allowing all modules to be clocked for initialization purposes. When reset is deasserted, bits 4 and 5 are set to '1 so that the DSP cores are stopped prior to their executing program code. The remaining bits in this register are unused and reserved for future compatibility.

Figure 5:
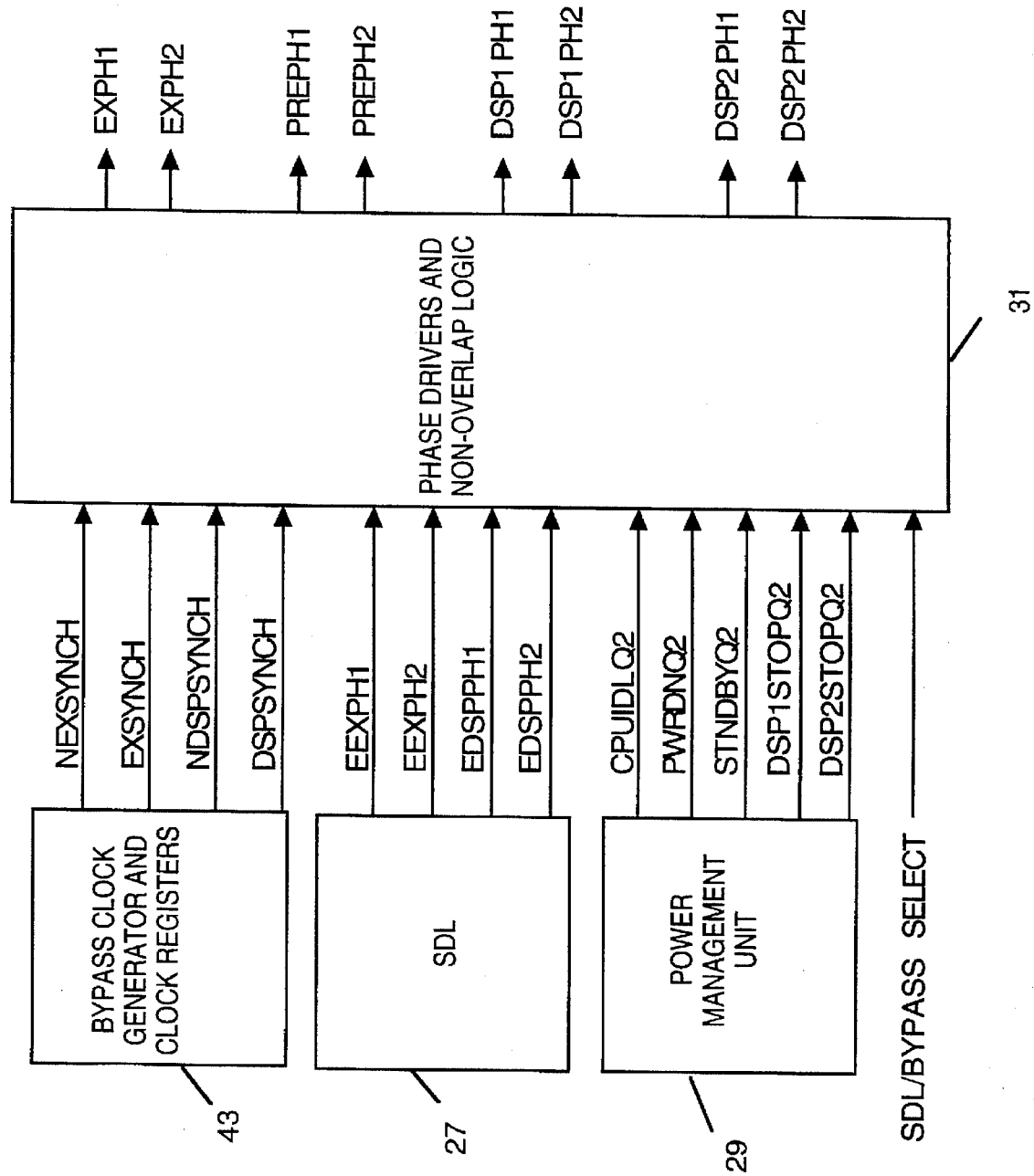
FIG. 5 is a block diagram showing the inputs to and outputs from the invented phase drivers and non-overlap logic circuit.

Referring now to FIG. 5, the inputs to phase drivers and non overlap logic circuit 31 are the signals NEXSYNCK, EXSYNCK, NDSPSYNCK and DSPSYNCK from bypass clock generator and clock registers 43. These signals may be generated from the input clock signal using frequency dividers as previously noted according to techniques well known in the art. A description of each of the signals is as follows:

NEXSYNCK—early phase 1 for the general purpose microprocessor.

EXSYNCK—early phase 2 for the general purpose microprocessor.

NDSPSYNCK—early phase 1 for digital signal processor.

DSPSYNCK—early phase 2 for digital signal processor.

The signals generated by SDL 27 are EEXPH1, EEXPH2, EDSPPH1 and EDSPPH2. The signals EEXPH1 and EEXPH2 are complementary zero non-overlap phase 1 and phase 2 clocks for the general purpose microprocessor (designated EX), the first E in the foregoing signals is used to reference that these are "early" phase 1 and phase 2 signals. The EDSPPH1 and EDSPPH2 signals are similarly the phase 1 and phase 2 clock signals for use by the two DSP processors. It should be noted that as described herein, the two DSPs use clock signals from a single clock and, therefore, must run at the same frequency. However, by adding another frequency divider in the bypass mode or by adding another pattern multiplier in the frequency synthesis mode or other mechanism for generating a different frequency, the first DSP can run at a different frequency from the second DSP. Of course, if there are additional microprocessors needing additional clock frequencies, suitable modifications to the circuits described herein should be readily apparent to persons skilled in the art.

Power management unit 29 generates the signals CPUIDLQ2, PWRDNQ2, STNDBYQ2, DSP1STOPQ2 and DSP2STOPQ2. The signals have the following meanings.

CPUIDLQ2 indicates that the chip is in idle mode, PWRDNQ2 indicates that the chip is power down mode, STNDBYQ2 indicates that the chip is in stand by mode. DSP1STOPQ2 indicates that the first DSP is temporarily stopped and the signal DSP2STOPQ2 indicates that the second DSP is temporarily stopped. A complete description of each power save feature could be found in copending application Ser. No. 08/174,770 filed Dec. 29, 1993. One additional signal input to phase drivers and non overlap logic 31 is SDL/BYPASS SELECT which is an external signal which selects for further processing clock phases generated by SDL 27 or the clock phases generated bypass generator and clock registers 43.

Figure 6:
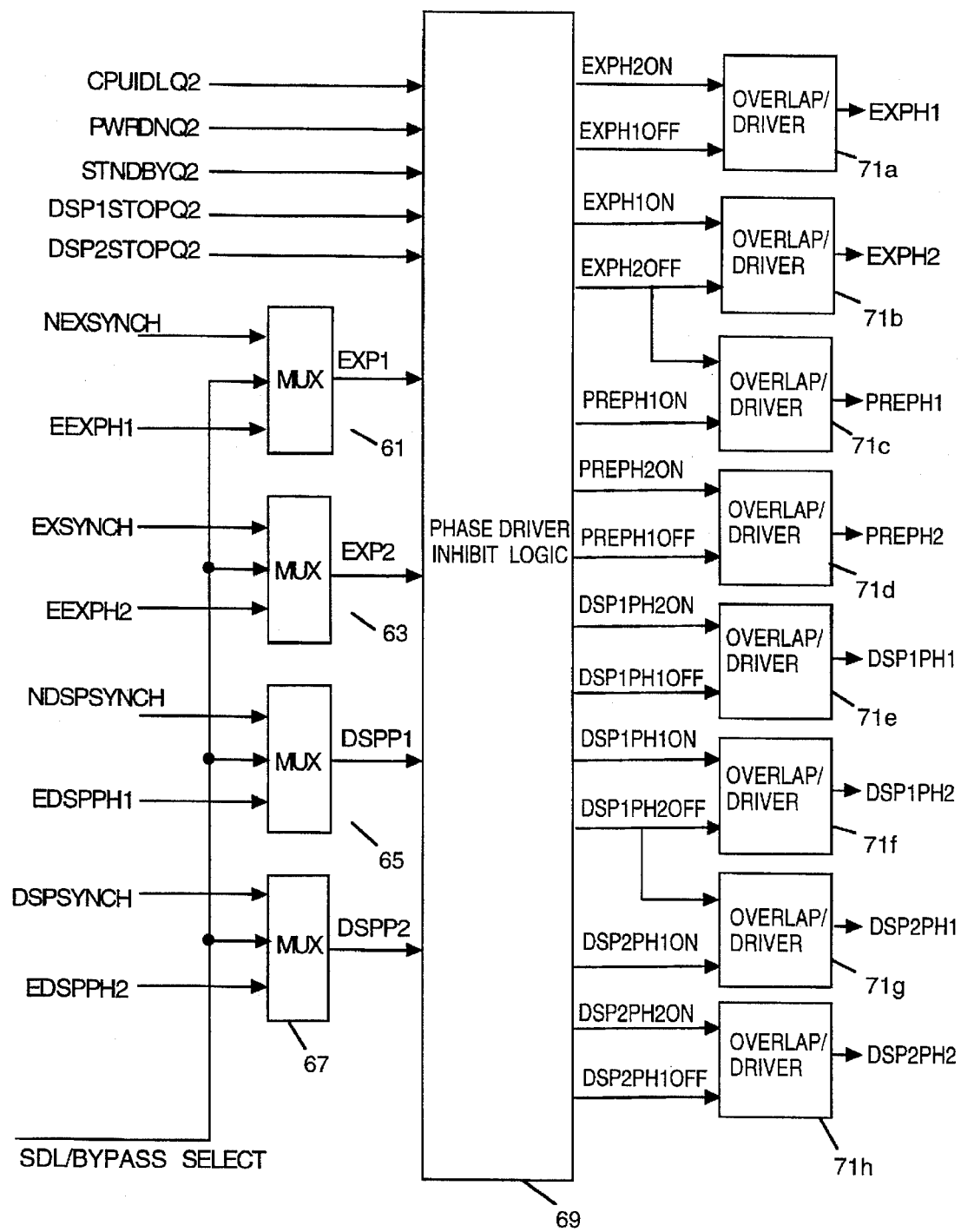
FIG. 6 is a block diagram of the invented phase drivers and non-overlap logic circuit.

The details of phase drivers and non overlap logic circuit 31 are shown in FIG. 6. Phase drivers and non overlap circuit 31 comprise multiplexors 61, 63, 65 and 67, phase driver inhibit logic 69 and non-overlap/phase driver circuits 71a–71h.

Multiplexors 61, 63, 65 and 67 are 2:1 multiplexors which select either the clock signals from bypass clock generator and clock registers 43 or from SDL 27 depending upon the state of SDL/BYPASS SELECT signal. For example, when the signal is asserted, the signals from bypass clock generator and clock registers 43 are selected by the MUXes and when the signal is deasserted, the signals from SDL 27 are selected. The selected signals namely EXP1, EXP2 (i.e., where EXP1 and EXP2 have zero non-overlap), DSPP1 and DSPP2 (i.e., where DSP1 and DSP2 have zero non-overlap) respectively are input to phase driver inhibit logic 69 along with the five signals from power management unit 29.

Figure 7A:
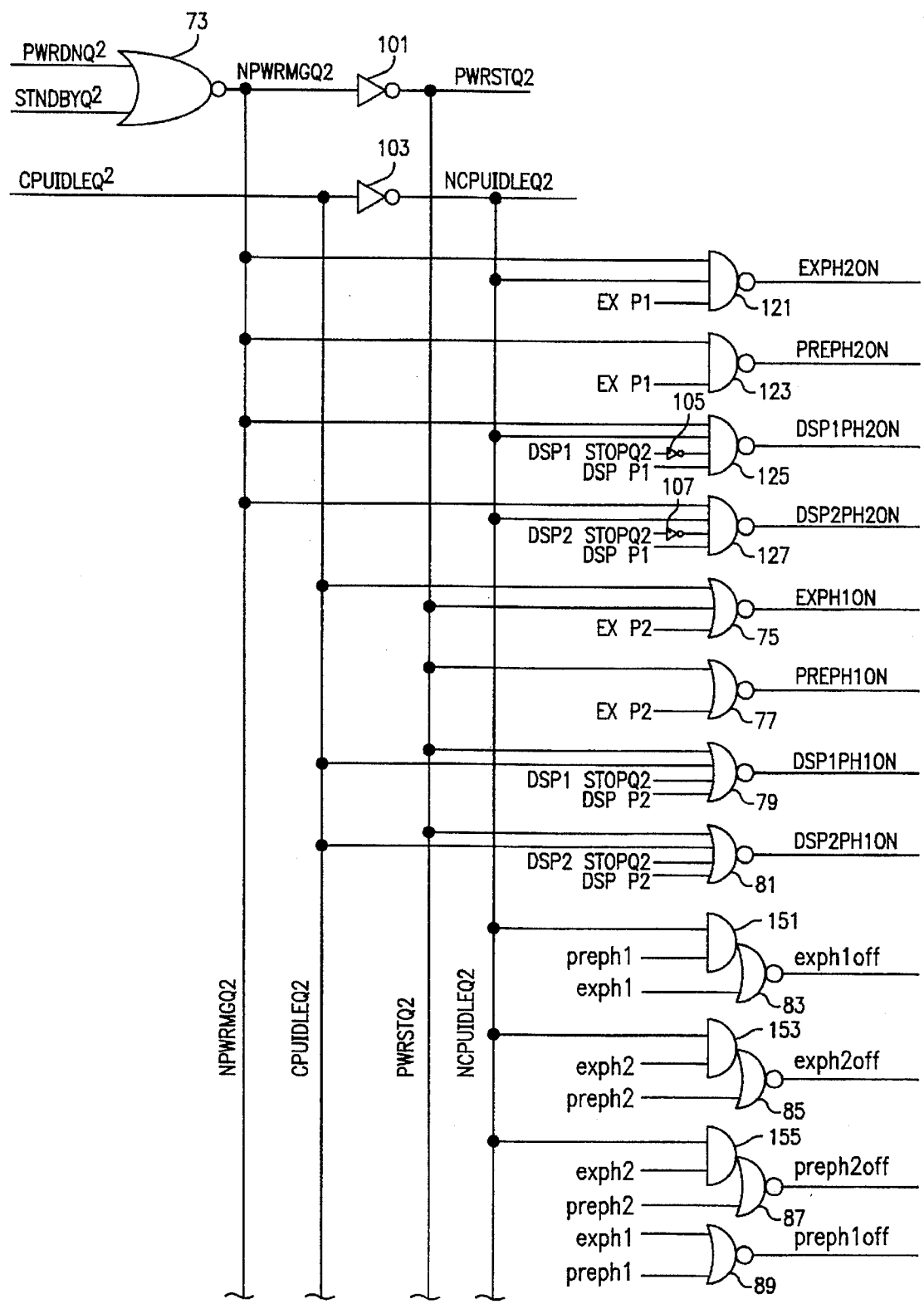
FIG. 7 is a schematic diagram of phase driver inhibit circuit 69.
Figure 7B:
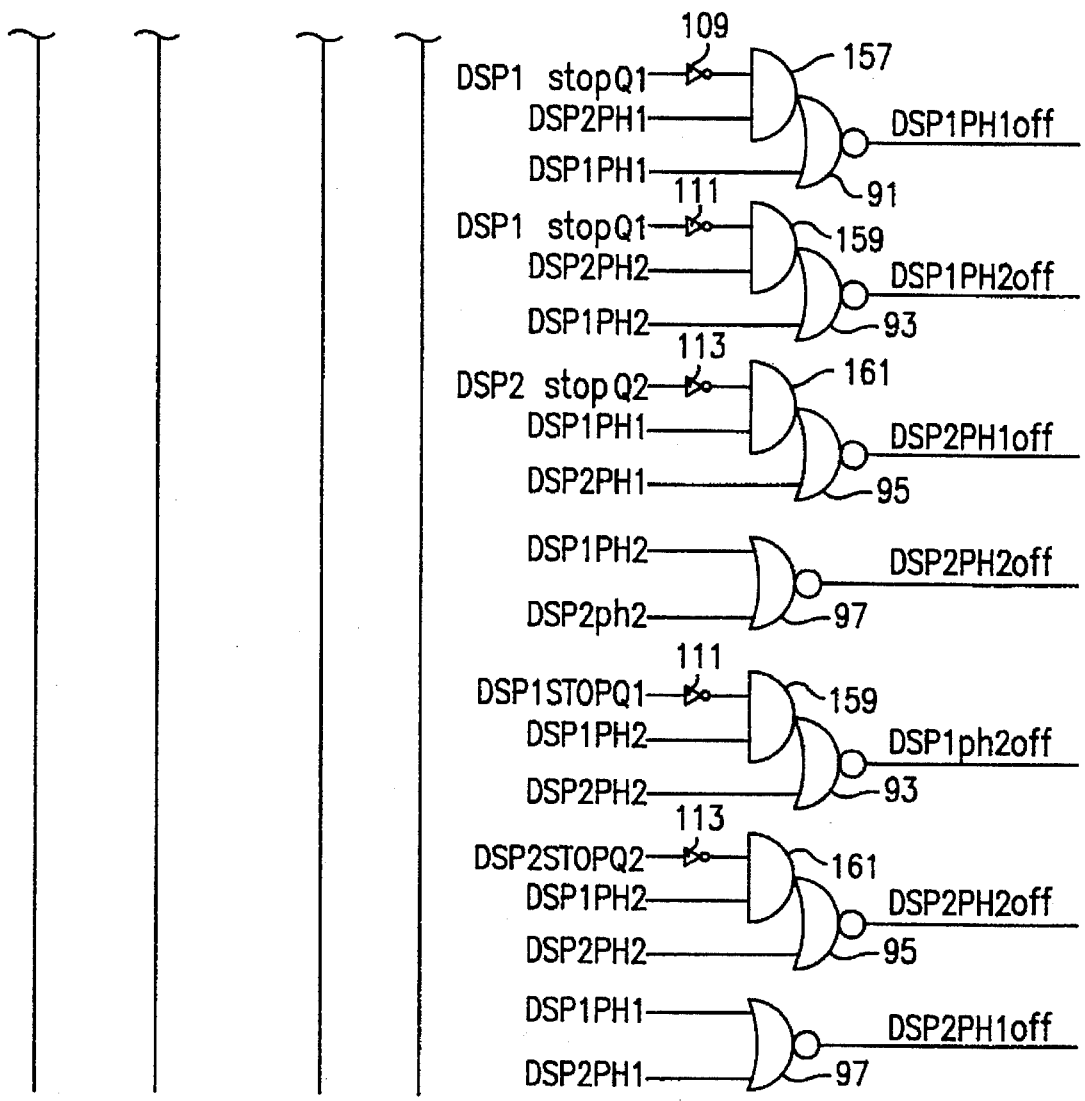

Referring now to FIG. 7, which is a schematic diagram of phase driver inhibit logic 69, the circuit comprises a set of gates namely, NOR gates 73, 75, 77, 79, 81, 83, 85, 87, 89, 91, 93, 95, 97, inverters 101, 103, 105, 107, 109 and 111, NAND gates 121, 123, 125, 127 and AND gates 151, 153, 155, 157, 159 and 161 which operate on the inputs to generate ON and OFF phase signals for each of the clock phases which are to be generated. These phase ON and phase OFF signals are input to corresponding non-overlap/phase driver circuits 71a–71h which generate the signals EXPH1, EXPH2, PREPH1, PREPH2, DSP1PH1, DSP1PH2, DSP2PH1, and DSP2PH2, respectively for use by the general purpose microprocessor, the peripherals, DSP1 and DSP2 respectively.

Figure 8:
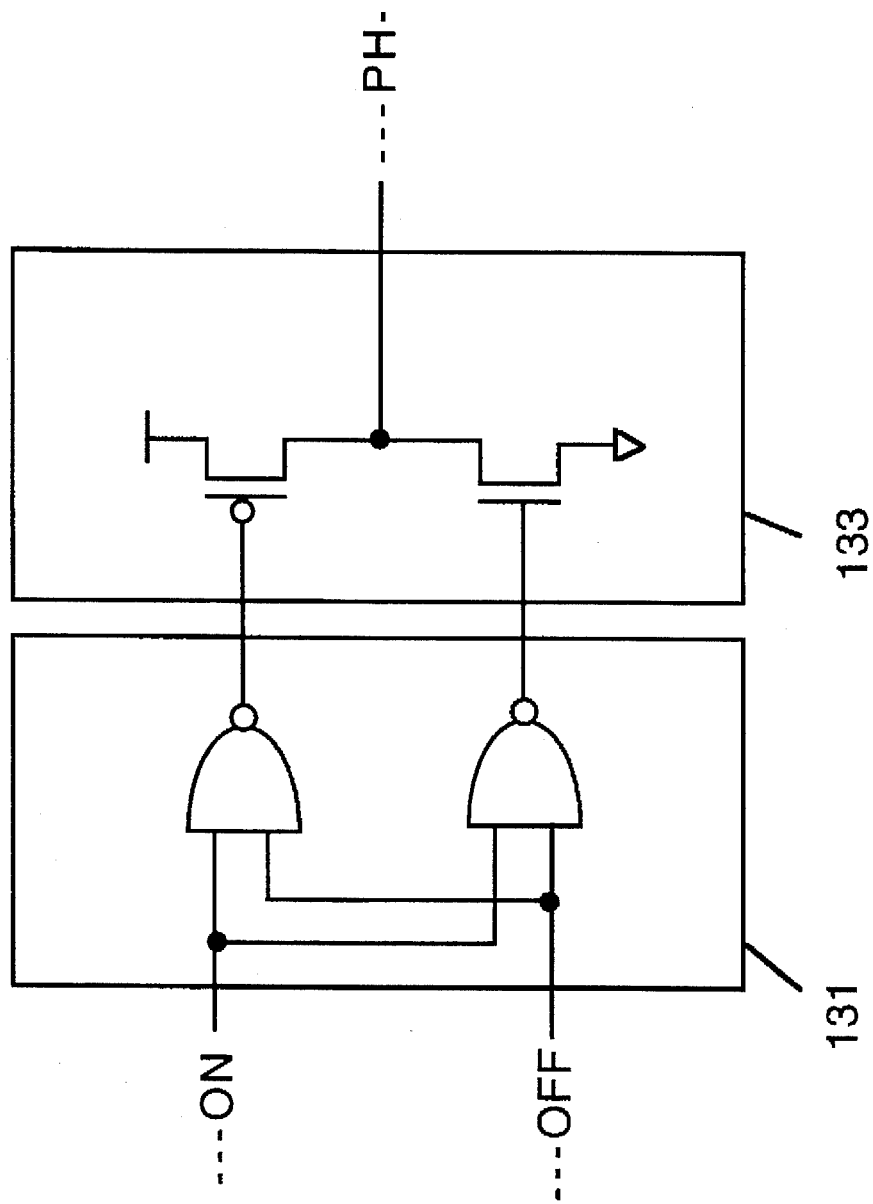
FIG. 8 is a schematic diagram of a single non-overlap/phase driver circuit.

FIG. 8 is an illustration of one of non-overlap/phase circuit 71a–71h, each being identical and comprising a non overlap generator 131 made up of coupled NAND gates and phase driver 133 implemented using a CMOS inverter.

In FIG. 8 the signal labeled —-ON represents one of the signals EXPH2ON, EXPH1ON, PREPH1ON, PREPH2ON, DSP1PH1ON, DSP1PH2ON, DSP2PH1ON or DSP2PH2ON. Similarly, the signal labeled —-OFF represents one of the signals EXPH1OFF, EXPH2OFF, PREPH1OFF, DSP1PH1OFF, DSP1PH2OFF or DSP2PH1OFF from FIG. 5. The output from phase driver 133 labeled —-PH- represents one of the signals EXPH1, EXPH2, PREPH1, PREPH2, DSP1PH1, DSP1PH2, DSP2PH1 or DSP2PH2 from FIG. 5.

I claim:

1. A multiple microprocessor integrated circuit comprising:
   a) a clock unit including power management circuitry means for placing the integrated circuit unit into a predetermined power management mode and non-overlap clock phase logic circuitry means for generating non-overlapped clock signals;
   b) a general purpose microprocessor which receives first clock signals from said clock unit;
   c) at least one additional microprocessor, each of which receives one of a set of second clock signals from said clock unit,
   d) a set of peripherals which receives third clock signals from said clock unit, wherein said non-overlap clock phase logic circuitry means generates separate phase 1 clocks and phase 2 clocks for each of said first clock signals, each of said set of second clock signals and said third clock signals such that each of said phase 1 and phase 2 clocks are non-overlapped.

2. A circuit including a clock generator for use with discrete microprocessors comprising:
   a) a clock unit including power management circuitry means for placing the integrated circuit unit into a predetermined power management mode and non-overlap clock phase logic circuitry means for generating non-overlapped clock signals;
   b) a general purpose microprocessor which receives first clock signals from said clock unit;
   c) at least one additional microprocessor, each of which receives one of a set of second clock signals from said clock unit,
   d) a set of peripherals which receives third clock signals from said clock unit, wherein said non-overlap clock phase logic circuitry means generates separate phase 1 clocks and phase 2 clocks for each of said first clock signals, each of said set of second clock signals and said third clock signals such that each of said phase 1 and phase 2 clocks are non-overlapped.

3. The circuit defined by claim 1 where said predetermined power management modes are one of powerdown, idle and standby.

4. The circuit defined by claim 2 where said predetermined power management modes are one of powerdown, idle and standby.

5. The circuit defined by claim 1 wherein said power management circuitry means comprises a logic circuit which generates signals which indicate that i) the integrated circuit is in one of an idle mode, a power down mode, a stand-by mode, and ii) at least one of the at least one additional microprocessors is temporarily stopped.

6. The circuit defined by claim 1 wherein said non-overlap clock phase logic circuitry means comprises logic circuits which operate cooperatively to generate said phase 1 clocks and said phase 2 clocks for each of said first clock signals, each of said set of second clock signals, and said third clock signals, such that each of said phase 1 and phase 2 clocks are non-overlapped.

* * * * *